June 25, 1935.  W. B. MATHEWSON  2,006,076
MATTRESS TUFTING DEVICE
Filed Feb. 20, 1934   5 Sheets-Sheet 1

Inventor.
Wilfred B. Mathewson
by Heard Smith & Tennant.
Attys.

June 25, 1935.  W. B. MATHEWSON  2,006,076
MATTRESS TUFTING DEVICE
Filed Feb. 20, 1934   5 Sheets-Sheet 2
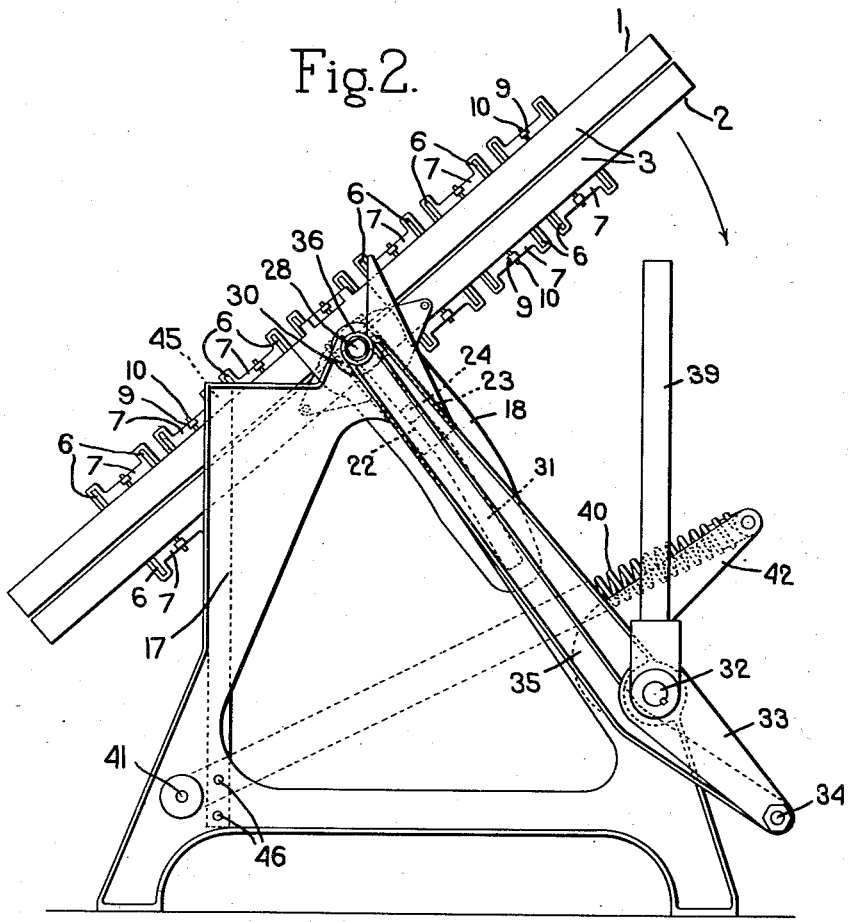
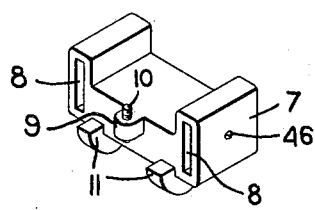
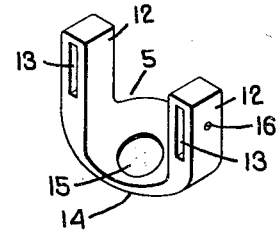
Inventor.
Wilfred B. Mathewson
by Heard Smith & Tennant
Attys.

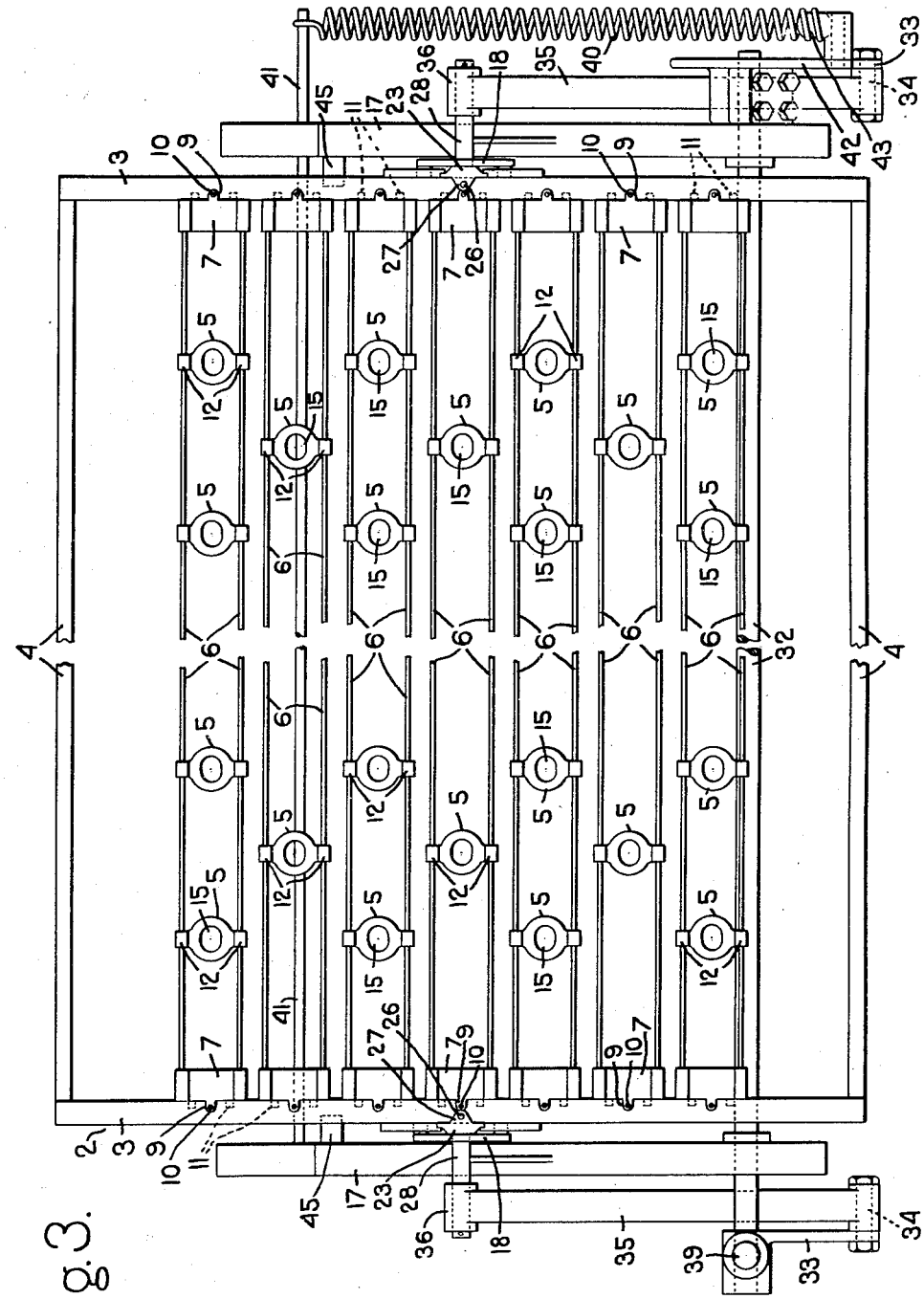

June 25, 1935.  W. B. MATHEWSON  2,006,076
MATTRESS TUFTING DEVICE
Filed Feb. 20, 1934   5 Sheets-Sheet 4
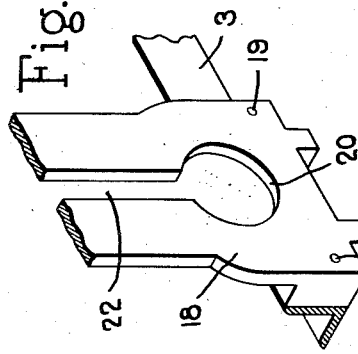
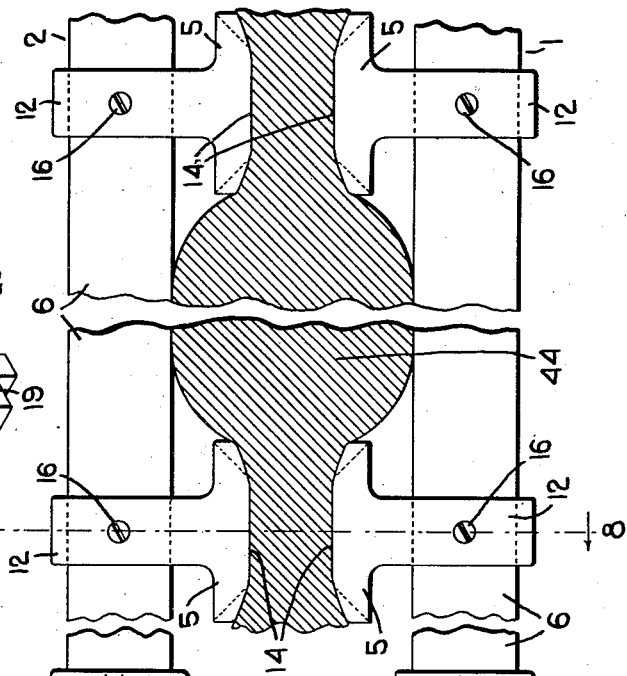
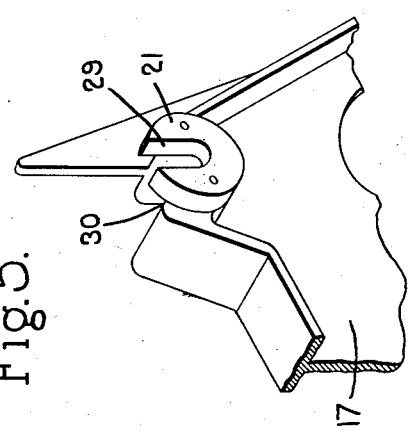
Inventor.
Wilfred B. Mathewson
by Heard Smith & Tennant.
Attys.

June 25, 1935.                W. B. MATHEWSON                2,006,076
                            MATTRESS TUFTING DEVICE
                   Filed Feb. 20, 1934         5 Sheets-Sheet 5
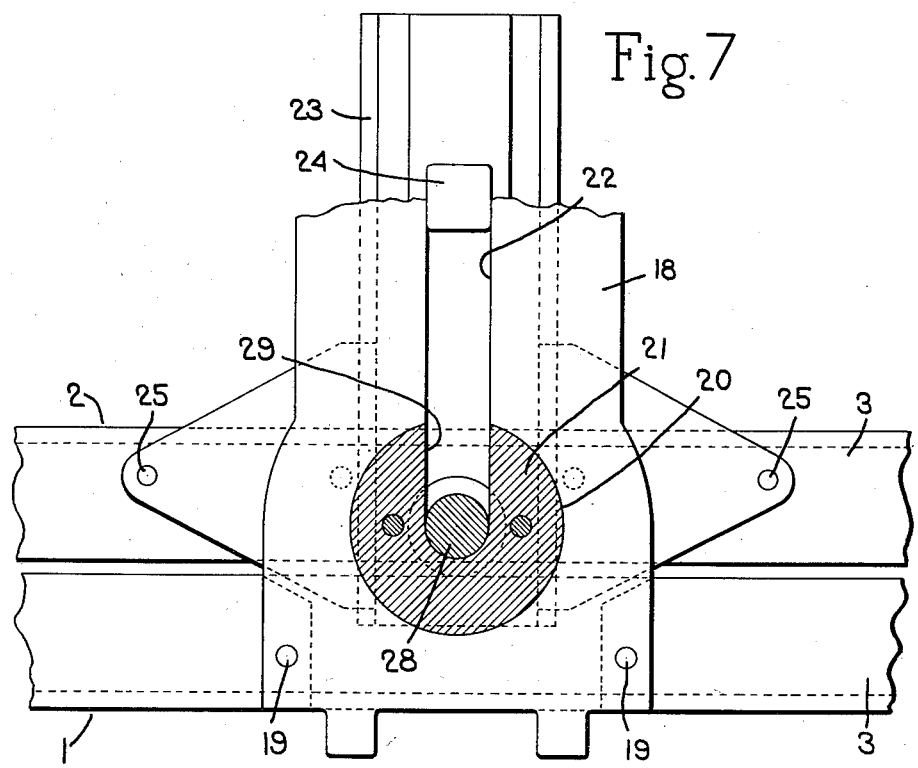
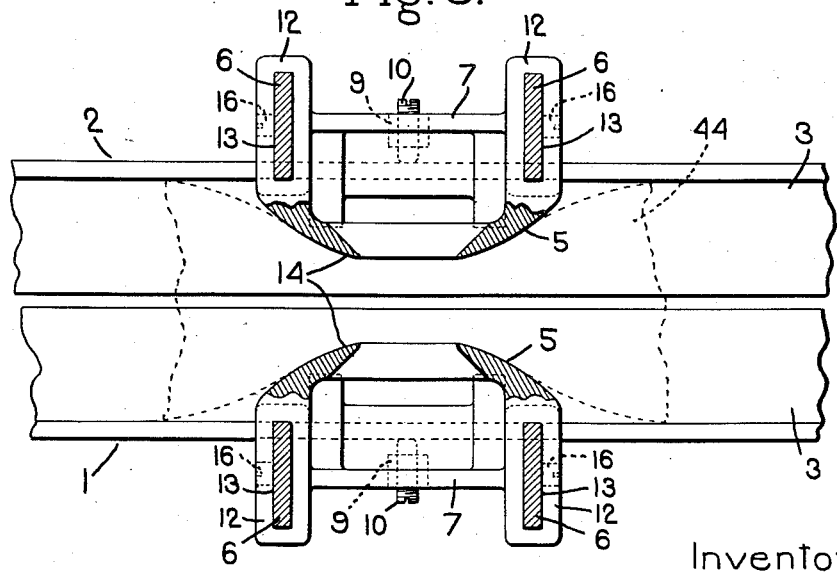
Inventor.
Wilfred B. Mathewson
by Heard Smith & Tennant.
                    Attys.

Patented June 25, 1935

2,006,076

UNITED STATES PATENT OFFICE 2,006,076

MATTRESS-TUFTING DEVICE

Wilfred B. Mathewson, North Weymouth, Mass., assignor to United Mattress Machinery Company, Quincy, Mass., a corporation of Maine Application February 20, 1934, Serial No. 712,201

12 Claims. (Cl. 112—3)

This invention relates to a device to be used in tufting mattresses by hand and it has for its general object to provide an improved device of this character by which the mattress is compressed and held in convenient position for the tying by hand of the tufting loops.

The novel features of the invention will be more fully hereinafter set forth and then pointed out in the appended claims.

In the drawings:

Fig. 2 shows the operation of reversing the mattress-compressing member;

Fig. 3 is a top plan view of the device;

Fig. 4 is an enlarged section on the line 4—4, Fig. 1;

Fig. 5 is a fragmentary perspective view showing the bearing on the supporting frame in which the mattress-compressing members are mounted to turn;

Fig. 6 is a fragmentary perspective view of the bearing on the mattress-compressing device;

Fig. 7 is a section on the line 7—7, Fig. 4;

Fig. 8 is a section on the line 8—8, Fig. 4;

Fig. 9 is a perspective view of one of the bracket members by which the cup-supporting bars are secured in position;

Fig. 10 is a perspective view of one of the compression cups.

Figures 1, 11:
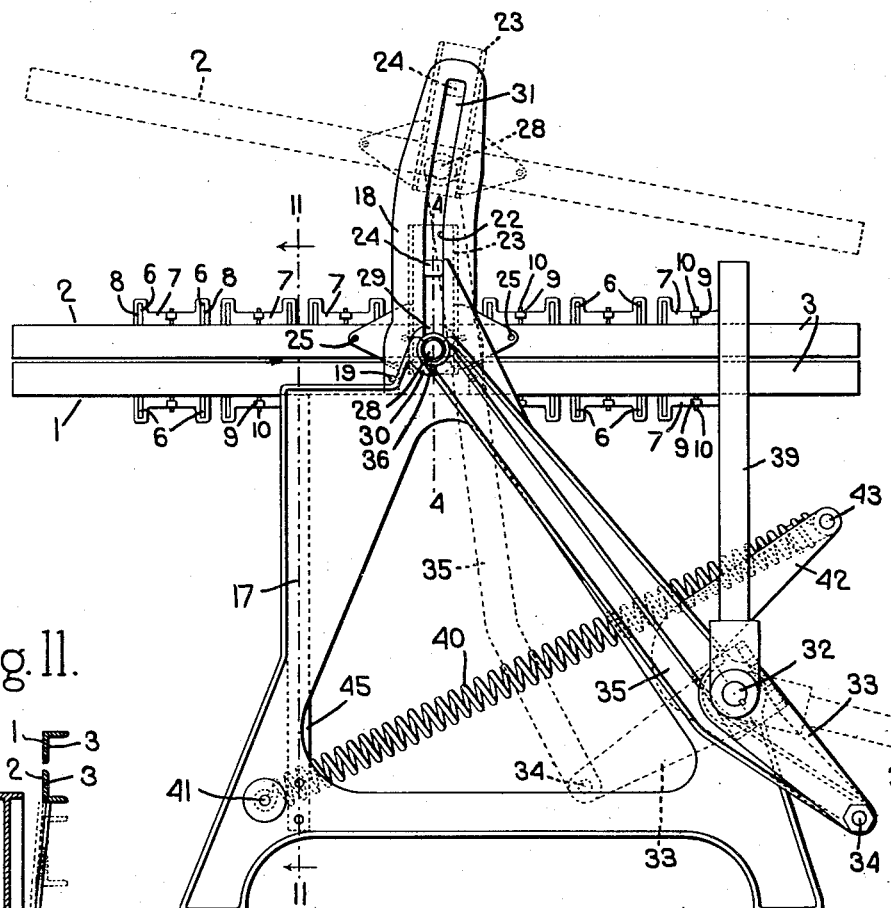
Fig. 1 is a side view of a device embodying my invention with the mattress-compressing member shown in position for inserting the tufting cords.
Fig. 11 is a section on the line 11—11, Fig. 1.

The device comprises a pair of mattress-compressing members between which the mattress is compressed, each member having a series of compression cups with the cups on one member disposed oppositely to those on the other member so that when the compressing members are brought into operative position the mattress will be compressed between each pair of opposed compression cups. These cups have holes through them as usual in devices of this sort so that the tufting cord or tufting element can be inserted through the holes in each pair of opposed compression cups and through the intervening mattress thereby performing the tufting operation.

These two mattress-compressing members are indicated generally at 1 and 2. Each member is in the form of a skeleton frame comprising end rails 3 which are connected by side rails 4. Each member carries a plurality of compression cups indicated generally at 5 and these cups are adjustably mounted so that the cups on either compression frame can be placed in different relative positions depending upon the way in which it is desired to tuft the mattress.

In the construction herein shown the compression cups are arranged in rows extending longitudinally of the frame and the compression cups in each row are adjustably supported on a pair of cup-supporting bars 6 which extend longitudinally of the frame. Each pair of bars is mounted at each end in a supporting bracket 7 which has the construction shown best in Fig. 9 and these supporting brackets 7 are secured to the end rails 3.

Each supporting bracket 7 is provided with two openings 8 in which the ends of the cup-supporting bars are received. Each supporting bracket is adjustably clamped to an end rail 3 so that the several supporting brackets 7 can be spaced different distances apart. The end rails 3 are shown as having an angle iron construction and each bracket member 7 is formed at one end with a boss 9 through which is threaded a clamping screw 10 and with two clamping fingers 11. The clamping fingers 11 overlie the inner face of the horizontal flange of the end rail 3 and the clamping screw 10 engages the outer face of said flange and thereby operates to clamp the bracket member to said flange. By loosening the screw 10 the bracket member 7 can be shifted longitudinally of the flange and by this construction the different pairs of cup-supporting bars 6 may be placed in any desired spaced relation.

Each compression cup 5 is formed with two wing portions 12 which are provided with openings 13 through which the cup-supporting bars 6 extend and each cup is also formed with the convex compressing face 14 and with the central opening 15 to permit the tufting elements or tufting cord to be inserted through the mattress.

The compression cups are adjustably held in position on the cup-supporting bars 6 by means of set screws 16. These compression cups can thus be adjusted into different positions on the supporting bars and by reason of the adjustability of the supporting brackets 7 and of the adjustability of the cups it is possible to give to the compression cups any desired relative arrangement depending on the pattern according to which it is desired to tuft the mattress.

It will be understood, of course, that the compression cups on the two compressing members 1 and 2 will be so disposed that the cups on one member will mate with or be situated opposite to those on the other member so that when the two members are brought into mattress-compressing position as shown in full lines, Fig. 1, the mattress will be compressed between the pairs of opposed compression cups.

These two mattress-compressing members 1 and 2 are supported on a main supporting frame comprising two end frame members 17 connected by a tie rod 41. Means are provided for separating the two compressing members 1 and 2 so as to permit an untufted mattress to be placed therein or to permit the removal of a mattress which has been tufted. The mattress-supporting member 1 is shown as mounted in the frame 17 so as to permit it to turn about a horizontal axis.

As herein shown each end rail 3 of the lower frame 1 has a combined bearing and guiding member 18 secured thereto through the medium of suitable bolts or screws 19. This member 18 is provided with a bearing opening 20 in which is received a hub 21 carried by the frame 17, this construction providing a pivotal support for the lower compressing member 1 which permits it to swing about a horizontal axis. Each combined bearing and guiding member 18 is provided with the guiding slot 22 which communicates with the opening 20 and which serves to guide the upper compressing member 2 in its movement toward and from the lower compressing member 1.

Each end rail 3 of the upper compressing member 2 has secured thereto a guiding bracket 23 which is provided with a guiding lug 24 that is received in the slot 22. The guiding bracket member 23 is secured to the end rail 3 by any suitable means such as clamping bolts 25 and I have also shown as part of the securing means a clamping screw 26 which screws through a lug 27 on the inner face of the bracket 23 and engages the top flange of the angle iron end member 3.

Each bracket member 23 also has rigid therewith a trunnion 28. The bearing member 21 is provided with a radial slot 29 and the frame 17 is also provided with an open bearing 30 in alignment with the slot 29. When the two compressing members 1 and 2 are in their mattress-compressing relation shown in full lines Fig. 1 and in Fig. 4 the trunnions 28 will occupy the slots 29 of the bearing members 21 and will also occupy the open slots 30. When the parts are in this relation the axis of each trunnion 28 coincides with the axis of its bearing member 21, and when the parts have this relation the two compressing members 1 and 2 can be turned about the bearing member 21 as a unit, both compressing members rotating about the same axis.

The reference numerals 45 indicate two stop members or positioning devices in the form of resilient arms which are secured to the end frames 17 as shown at 46. These arms are inclined inwardly from the frame ends 17 and the upper ends of the arms normally occupy a position beneath the end rails 3. When the compressing device is in the horizontal position shown in Fig. 1 the end rails 3 of the lower compressing member 1 rest on the stop devices 45 as best seen in Fig. 11 thereby retaining the mattress-compressing device in its horizontal position. With the parts in this position the upper compressing member 2 can be raised or separated from the lower compressing member 1 for the introduction of a mattress between them or for the purpose of removing a tufted mattress.

For thus raising the upper compressing member 2 and thereby separating it from the lower compressing member 1 when the parts are in the horizontal position shown in Fig. 1, I have provided a device which acts on the trunnions 28 to raise them upwardly in the slots 22. During this raising movement the upper compressing member is held from turning by the guiding lug 24 which slides upwardly in the slot 22. The upper end 31 of the slots 22 is bent slightly to the rear and as the upper compressing member is raised into the dotted line position Fig. 1 the co-operation of said lug 24 with said upper end of the slot gives the upper compressing member a slight angular movement with reference to a horizontal line so that the two members will be separated a greater distance apart at the left of Fig. 1 than at the right. The mattress is inserted between the members from the left and by thus providing for swinging the upper member into the slightly angular position an increased separation between the compressing members will be provided at the side where the mattress is introduced and this facilitates the placing of the mattress between the compression members.

The device for acting on the trunnions 28 to raise them upwardly in the slots 22 comprises a rock shaft 32 which extends the length of the frame and which has fast thereto at each end an arm 33, the outer end of each arm being pivotally connected at 34 to one end of a link 35, the other end of which has a bearing 36 in which the end of the trunnion 28 is received.

The rock shaft is provided with a handle 39 by which it may be turned. When the handle is swung from the full to the dotted line position Fig. 1 the arms 33 will be swung from the full to the dotted line position and this movement of said arms will operate through the links 35 to raise the trunnions 28 and thereby lift the upper clamping member into its open position shown in dotted lines Fig. 1. A reverse movement of the lever 39 lowers the upper compressing member and brings it into mattress-compressing position shown in full lines Fig. 1.

It will be noted that as the arms 33 approach the full line position in their swinging movement from the dotted to the full line position in Fig. 1 the pivotal connection 34, the rock shaft 32, and the trunnion 28 come into substantial alignment and thus the arm 34 and link 35 has a toggle lever action during the final compressing of the mattress. This is of advantage because thereby the compressing force is greatly increased.

40 indicates a spring which is constructed so that it tends to hold the upper compressing member 2 in either its compressing position or its open position. This spring is a pulling spring which at attached at one end to the tie rod 41 and at the other end to the end of an arm 42 which is fast on the rock shaft 32. The arm 42 is so disposed that as the rock shaft is turned from the full to the dotted line position Fig. 1 the point 43 where the spring connects to the arm 42 will pass from one side to the other of the shaft 32 so that when the parts are in full line position Fig. 1 said spring will tend to hold the compressing member 1 in its compressing position and when the parts are in dotted line position said spring will tend to hold the compressing member in its raised position.

In using the device the compressing frames will be swung into the horizontal position shown by full lines Fig. 1 and then the upper compressing member 2 will be raised into the dotted line position as shown in Fig. 1 thereby separating the two compressing members for the introduction of a mattress 44. This mattress is placed on the lower compressing member, after which the lever 39 is swung downwardly into the dotted line position thereby closing the upper compressing member 2 against the mattress. During this operation the opposed compression cups compress the mattress as indicated in Fig. 4. After the mattress has been thus compressed between the compressing members 1 and 2 then the tufting by hand may be proceeded with.

The tufting elements are usually inserted through the mattress by a needle and the openings 15 in the compression cups provide for the insertion of the needle through the mattress at each point where it is compressed. The mattress may be tufted with any desirable form of tuft and these tufting elements may be inserted through the mattress from the upper side while the compressing members are in their horizontal position shown in full lines Fig. 1. After all the separate tufting members have been inserted through the mattress from the top side so that the ends of the tufting elements are projecting through the mattress on the lower side then said compression members, with the intervening mattress, are turned about their common axis into a positon reversed from that shown in Fig. 1 and in which the compressing member 1 is on the upper side and the compressing member 2 on the lower side.

Fig. 2 shows the operation of thus reversing the compressing device, said figure showing the compressing members 1 and 2 being swung about their common axis clockwise or in the direction of the arrow. As the compressing members swing toward and through the position shown in Fig. 2 the end rails 3 of the upper compressing member 1 engage the inner face of the resilient arms 45 and force the same backwardly as shown by dotted lines in Fig. 11 thereby allowing the complete reversal of the compressing members. When the position of the members has been completely reversed and the end rails 3 of the compressing member 2 have been carried above the arms 45 the latter, will, by their resiliency, spring forwardly into position underneath the compressing member 2 thereby serving to position the members in their reverse position. This reversing of the compression members brings the free ends of tufting elements on the upper side and the operator then ties said projecting ends and thereby completes the tufting operation. When all the tufting elements have been tied or fastened then the mattress-compressing device is given a further turning movement about its axis into its original position shown in full lines Fig. 1 thus bringing the guiding slots 22 into alignment with the slots 29 of the bearing hubs 21. The lever 39 may then be operated to raise the upper compressing member into the dotted line position thus releasing the tufted mattress so that it can be removed from the device.

I claim:

1. A mattress-tufting device comprising a supporting frame, two compressing members between which the mattress is compressed, a rock shaft journalled in the supporting frame below the compression members, two arms fast on the rock shaft, links connecting the arms to the ends of one of said compressing members at the central portion thereof, means to rock the rock shaft thereby to move the latter compressing member toward and from the other compressing member, and means to guide the movable compressing member in its movement.

2. A mattress-tufting device comprising a supporting frame, two compressing members between which the mattress is compressed, a rock shaft journalled in the supporting frame below the compression members, two arms fast on the rock shaft, links connecting the arms to the ends of one of said compressing members at the central portion thereof, means to rock the rock shaft thereby to move the latter compressing member toward and from the other compressing member, and means carried by said other compressing member to guide the movable compressing member in its movement.

3. A mattress-tufting device comprising a supporting frame, two compressing members between which the mattress is compressed, one of said members having a guiding bracket secured to each end thereof, a rock shaft journalled in the frame, two arms fast on the rock shaft, a link connecting each arm to one of said guiding brackets, means to rock the rock shaft thereby to move the latter compressing member toward and from the other compressing member, a slotted guiding member secured to each end of said other compressing member, said guiding brackets co-operating with the guiding members to guide the movable compressing member in its movement.

4. A mattress-tufting device comprising a supporting frame, two compressing members between which the mattress is compressed, a rock shaft journalled in the frame, two arms fast on the rock shaft, links connecting the arms to one of said compressing members, means to rock the rock shaft thereby to move the latter compressing member toward and from the other compressing member, means to guide the movable compressing member in its movement, and a spring acting on the rock shaft and tending to hold the movable compressing member in either its open or its closed position.

5. A mattress-tufting device comprising a supporting frame, two compressing members between which the mattress is compressed, means for pivotally mounting one of said members on the frame for turning about a horizontal axis, said compressing member having at each end a slotted guiding member, a guiding bracket secured to each end of the other compressing member and provided with both a trunnion and a guiding projection operating in said slot, and means connected with said trunnions and operative when the compressing members are in horizontal position to separate said other compressing member from the first-named member.

6. A mattress-tufting device comprising two compressing members for compressing a mattress between them, each member comprising a skeleton frame having angle iron end rails and side rails connecting the end rails, a plurality of supporting brackets secured to each end rail of each skeleton frame, each bracket having a pair of sockets and also having laterally-extending clamping fingers engaging one face of the horizontal leg of the angle iron, a laterally-extending lug and a clamping screw screw-threaded through said lug and engaging the opposite face of said leg, a pair of cup-supporting bars supported at each end in a supporting bracket, and a plurality of compression cups adjustably carried by each pair of supporting bars.

7. A mattress-tufting device comprising two compressing members for compressing a mattress between them, each member comprising a skeleton frame having angle iron end rails and side rails connecting the end rails, a plurality of supporting brackets adjustably secured to each end rail of each skeleton frame, each bracket having a pair of sockets and also having laterally-extending clamping fingers engaging one face of the horizontal leg of the angle iron, a laterally-extending lug and a clamping screw screw-threaded through said lug and engaging the opposite face of said leg, a pair of cup-supporting bars supported at each end in a supporting bracket, and a plurality of compression cups adjustably carried by each pair of supporting bars each cup having two wing portions provided with apertures through which the supporting bars extend.

8. A mattress-tufting device comprising a supporting frame, two compressing members between which the mattress is compressed, means for pivotally mounting one of said members on the frame for turning about a horizontal axis, said compressing member having at each end a slotted guiding member, a guiding bracket secured to each end of the other compressing member and provided with both a trunnion and a guiding projection operating in said slot, means connected with said trunnions and operative when the compressing members are in horizontal position to separate said other compressing member from the first-named member, and resilient stop arms carried by the frame and operating to position the compressing members in horizontal position.

9. A mattress-tufting device comprising a supporting frame having two slotted bearing hubs, two compressing members between which the mattress is compressed, a slotted guiding member secured to each end of one of the compressing members, each guiding member having a bearing portion to receive and rotate about one of the hubs, trunnions secured to the other compressing member and when the compressing members are in mattress-compressing position occupying a position coaxial of said hubs, said compressing members being rotatable about the hub, and means connected to said trunnions and operative when the slots in the guiding members are aligned with the slots in the hubs to separate the compressing members.

10. A mattress-compressing device comprising a supporting frame, two compressing members between which the mattress is compressed, one of said members being pivotally mounted in said frame for turning movement about a horizontal axis, a rock shaft journalled in said frame, two arms fast on the rock shaft, a link connected to each arm and pivotally connected to one end of the other compressing member, and means to turn the rock shaft and thereby move said other compressing member into and out of mattress-compressing relation with the pivotally-mounted member, the pivotal connection between the links and said other compressing member being axially aligned with the axis of the pivotally-mounted compressing member when said two compressing members are in mattress-compressing relation.

11. A mattress-compressing device comprising a supporting frame, two compressing members between which the mattress is compressed, one of said members being pivotally mounted in the frame for turning about a horizontal axis, two trunnions extending from the ends of the other compressing member, and means connected with said trunnions for moving said other compressing member into and out of mattress-compressing relation to the pivotally-mounted member, said trunnions being coaxial with the axis of the pivotally-mounted member when the members are in mattress-compressing relation.

12. A mattress tufting device comprising a supporting frame, two mattress-compressing members between which the mattress is compressed, one of said members being pivotally mounted in the frame for turning about a horizontal axis, means having a pivotal connection with the other compressing member for moving the latter into and out of mattress-compressing relation with the pivotally-mounted member, said pivotal connections being coaxial with the axis of the pivotally-mounted member when the two members are in mattress-compressing relation.

WILFRED B. MATHEWSON.